(12) United States Patent
Kuno

(10) Patent No.: US 8,804,196 B2
(45) Date of Patent: Aug. 12, 2014

(54) PRINT CONTROL DEVICE EXECUTING ERROR DIFFUSION PROCESS USING RANDOM NUMBER

(71) Applicant: Brother Kogyo Kabushiki Kaisha, Nagoya (JP)

(72) Inventor: Masashi Kuno, Obu (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 13/830,329

(22) Filed: Mar. 14, 2013

(65) Prior Publication Data

US 2013/0335782 A1    Dec. 19, 2013

(30) Foreign Application Priority Data

Jun. 14, 2012 (JP) .................................. 2012-134474

(51) Int. Cl.
*H04N 1/40* (2006.01)

(52) U.S. Cl.
USPC .......................... 358/3.03; 358/3.04; 358/3.05

(58) Field of Classification Search
None
See application file for complete search history.

(56) References Cited

U.S. PATENT DOCUMENTS

| | | | |
|---|---|---|---|
| 5,825,940 A | 10/1998 | Yamagata et al. | |
| 6,031,627 A | 2/2000 | Kakutani | |
| 6,089,691 A | 7/2000 | Kakutani | |
| 6,099,105 A | 8/2000 | Kakutani | |
| 6,563,604 B1 | 5/2003 | Mirimatsu et al. | |
| 6,602,003 B2 | 8/2003 | Kakutani | |
| 6,943,918 B1 | 9/2005 | Kakutani | |
| 7,034,964 B2 * | 4/2006 | Suzuki | ........................ 358/3.06 |
| 7,298,525 B2 * | 11/2007 | Hagai et al. | .................... 358/1.9 |
| 7,446,903 B2 | 11/2008 | Hagai et al. | |
| 7,463,387 B2 | 12/2008 | Hagai et al. | |
| 7,554,697 B2 | 6/2009 | Mizutani et al. | |
| 7,929,183 B2 * | 4/2011 | Kakutani | ..................... 358/3.16 |
| 8,416,457 B2 | 4/2013 | Kakutani | |
| 8,643,904 B2 * | 2/2014 | Kuno | .......................... 358/3.03 |
| 2003/0053098 A1 | 3/2003 | Hagai et al. | |
| 2003/0169455 A1 | 9/2003 | Takahashi et al. | |

(Continued)

FOREIGN PATENT DOCUMENTS

| | | |
|---|---|---|
| JP | H08-204960 A | 8/1996 |
| JP | H10-157167 A | 6/1998 |
| JP | 2000-006444 A | 1/2000 |
| WO | 98/03341 A1 | 1/1998 |

OTHER PUBLICATIONS

Notice of Allowance issued in related U.S. Appl. No. 13/830,213 mailed Apr. 8, 2014.

*Primary Examiner* — Dung Tran
(74) *Attorney, Agent, or Firm* — Merchant & Gould PC

(57) ABSTRACT

In an error diffusion process, a random number acquiring unit acquires a random number included in a first random number range that depends on the gradation value of the target pixel data, in a case that the gradation value of the target pixel data is in a first range. The first correcting unit corrects the gradation value of the target pixel data into a first corrected gradation value by using the random number. The dot value setting unit sets a dot value of the target pixel data to either a first dot value or a second dot value. The first random number range corresponding to the gradation value smaller than the second threshold value includes a specific random number such that the first correcting unit corrects the gradation value into the first corrected gradation value greater than the second threshold value by using the specific random number.

11 Claims, 6 Drawing Sheets

(56) References Cited

U.S. PATENT DOCUMENTS

| | | | |
|---|---|---|---|
| 2008/0259361 A1* | 10/2008 | Kakutani | 358/1.8 |
| 2011/0033124 A1* | 2/2011 | Kuno | 382/233 |
| 2012/0188609 A1* | 7/2012 | Kuno | 358/3.02 |
| 2013/0027753 A1* | 1/2013 | Yoshida | 358/3.13 |
| 2013/0335781 A1 | 12/2013 | Kuno | |
| 2013/0335782 A1* | 12/2013 | Kuno | 358/3.03 |

* cited by examiner

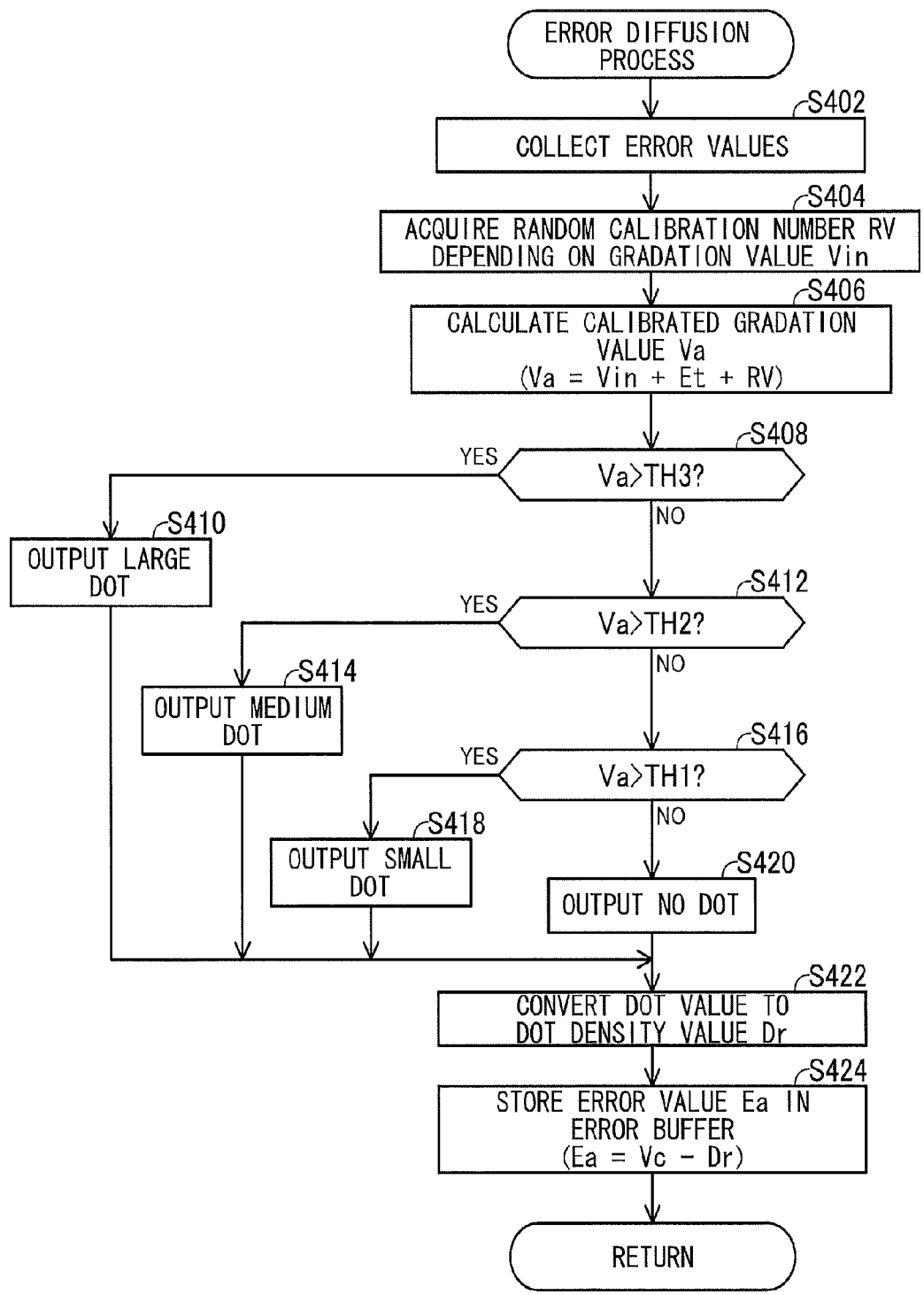

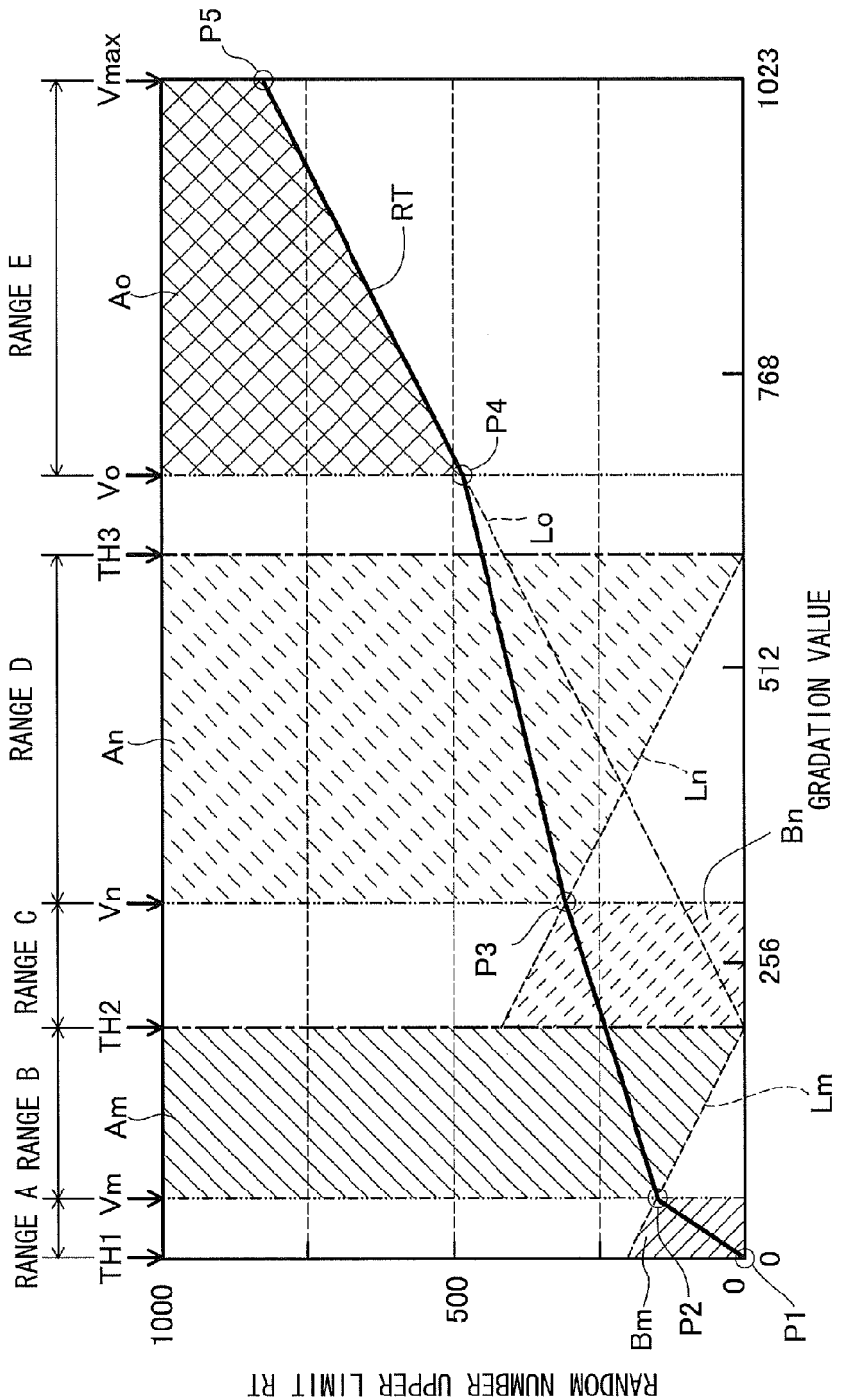

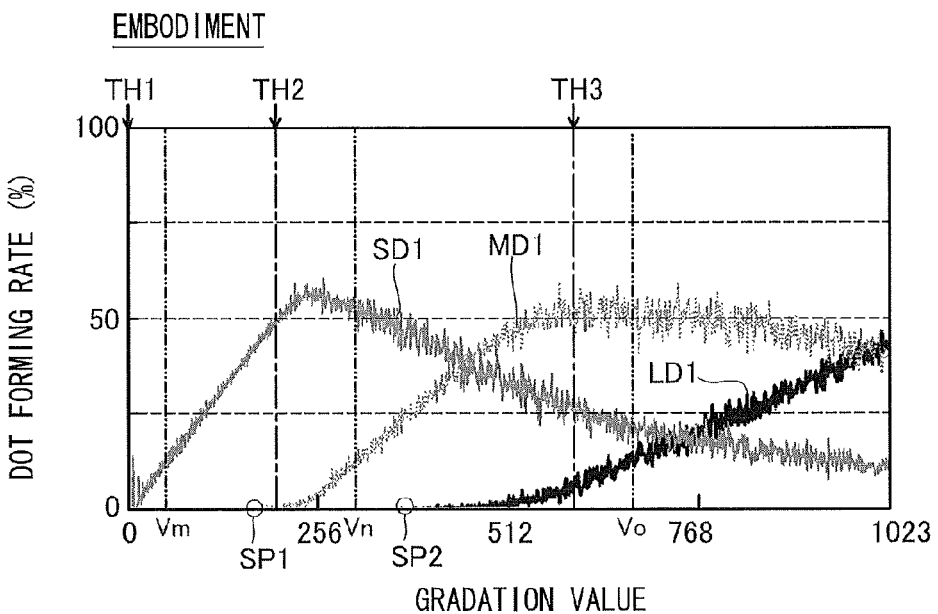
FIG. 6(A) EMBODIMENT
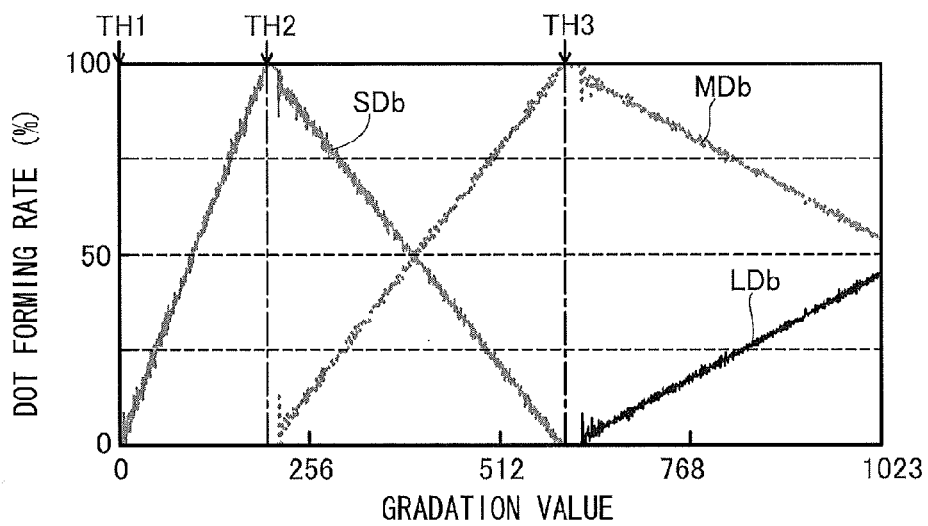
FIG. 6(B) COMPARATIVE EXAMPLE

PRINT CONTROL DEVICE EXECUTING ERROR DIFFUSION PROCESS USING RANDOM NUMBER

CROSS REFERENCE TO RELATED APPLICATION

This application claims priority from Japanese Patent Application No. 2012-134474 filed Jun. 14, 2012. The entire content of the priority application is incorporated herein by reference.

TECHNICAL FIELD

The present invention relates to the image processing of images to be printed, and particularly to a halftone process using error matrices.

BACKGROUND

An inkjet printing device known in the art prints images by ejecting ink droplets from a print head onto paper to form dots (print pixels). Printing is performed using a plurality of dot types, such as dark and light dots or large and small dots. To executed this type of printing, a technique for optimizing the proportions of dot types to improve image quality is required. For example, dot recording rates set for each dot type based on input gradation values may be compared to threshold values to generate dot data representing which dot is to be formed.

SUMMARY

Therefore, it is an object of the present invention to provide a technology different from the conventional technology described above that is capable of improving the quality of printed images produced using a plurality of dot types.

In order to attain the above and other objects, the invention provides a print control device. The print control device includes a processor and a memory that stores a computer program that, when executed by the processor, causes the control device to function as: an acquiring unit, an executing unit, and an output unit. The acquiring unit is configured to acquire image data representing an image including a plurality of pixels. The image data includes a plurality of pixel data corresponding to the plurality of pixels. Each of the plurality of pixel data includes a gradation value. The executing unit is configured to execute an error diffusion process on each of the plurality of pixel data. The executing unit includes a target pixel setting unit, a random number acquiring unit, a first correcting unit, a second correcting unit, a determining unit, a dot value setting unit, and an error value setting unit. The target pixel setting unit is configured to set target pixel data from among the plurality of pixel data. The random number acquiring unit is configured to acquire a random number included in a first random number range that depends on the gradation value of the target pixel data, in a case that the gradation value of the target pixel data is in a first range. The first correcting unit is configured to correct the gradation value of the target pixel data into a first corrected gradation value by using the random number. The second correcting unit is configured to correct the first corrected gradation value of the target pixel data into a second corrected gradation value by using a distribution error. The distribution error is set by at least one error value of at least one pixel data on which the error diffusion process has been executed. The determining unit configured to determine whether the second corrected gradation value of the target pixel data is greater than a plurality of threshold values. The plurality of threshold values includes a first threshold value and a second threshold value, the second threshold value being greater than the first threshold value. The dot value setting unit is configured to set a dot value of the target pixel data to either a first dot value or a second dot value. The first dot value is set when the second corrected gradation value is greater than the first threshold value. The second dot value is set when the second corrected gradation value is greater than the second threshold value. The first dot value indicates a size of a dot. The second dot value indicates a size of a dot greater than the size of the dot indicated by the first dot value. The error value setting unit is configured to set an error value of the target pixel data based on the dot value of the target pixel data. The output unit is configured to output print data determined by the dot value for each of the plurality of pixel data. The first random number range corresponding to the gradation value smaller than the second threshold value includes a specific random number such that the first correcting unit corrects the gradation value included in the first range into the first corrected gradation value greater than the second threshold value by using the specific random number in the first random number range, the first range being greater than a first gradation value and smaller than the second threshold value, the first gradation value being greater than the first threshold value and smaller than the second threshold value.

According to another aspect, the present invention provides a print control device. The print control device includes a processor and a memory that stores a computer program that, when executed by the processor, causes the control device to function as: an acquiring unit, an executing unit, and an output unit. The acquiring unit is configured to acquire image data representing an image including a plurality of pixels. The image data includes a plurality of pixel data corresponding to the plurality of pixels, each of the plurality of pixel data including a gradation value. The executing unit is configured to execute an error diffusion process on each of the plurality of pixel data. The executing unit includes a target pixel setting unit, a random number acquiring unit, a first correcting unit, a second correcting unit, a determining unit, a dot value setting unit, and an error value setting unit. The target pixel setting unit is configured to set target pixel data from among the plurality of pixel data. The random number is acquiring unit configured to acquire a random number included in a random number range that depends on the gradation value of the target pixel data, in the case that the gradation value of the target pixel data is in a gradation range. The gradation range is greater than or equal to a first gradation value and smaller than or equal to a second gradation value. The first correcting unit is configured to correct the gradation value of the target pixel data into a first corrected gradation value by using the random number. The second correcting unit is configured to correct the first corrected gradation value of the target pixel data into a second corrected gradation value by using a distribution error. The distribution error is set by at least one error value of at least one pixel data on which the error diffusion process has been executed. The determining unit is configured to determine whether the second corrected gradation value of the target pixel data is greater than a plurality of threshold values. The plurality of threshold values includes a first threshold value, a second threshold value, and a third threshold value. The second threshold value is greater than the first threshold value. The third threshold value is greater than the second threshold value. The dot value setting unit is configured to set a dot value of the target pixel data to one of a first dot value, a second dot value, and a third dot value. The first dot value is set when the second corrected gradation value is greater than the first threshold value. The second dot value is set when the second corrected gradation value is greater than the second threshold value. The third dot value is set when the second corrected gradation value is greater than the third threshold value. The first dot value indicates a size of a dot. The second dot value indicates a size of a dot greater than the size of the dot indicated by the first dot value. The third dot value indicates a size of a dot greater than the size of the dot indicated by the second dot value. The error value setting unit is configured to set an error value of the target pixel data based on the dot value of the target pixel data. The output unit is configured to output print data determined by the dot value for each of the plurality of pixel data. The first gradation value is greater than the first threshold value and smaller than the second threshold value. The second gradation value is greater than the second threshold value and smaller than the third threshold value. The random range includes an upper limit value and a lower limit value. One of the upper limit value and the lower limit value changes linearly according to change of the gradation value in the gradation range. The first correcting unit corrects the first gradation value into the first corrected gradation value substantially equal to the second threshold value by using, as the random number, a first specific value. The first specific value is the one of the upper limit value and a lower limit value when the gradation value is the first gradation value. The first correcting unit corrects the second gradation value into the first corrected gradation value substantially equal to the second threshold value by using, as the random number, a second specific value. The second specific value is a maximum random number in the random number range when the gradation value is the second gradation value.

According to another aspect, the present invention provides a non-transitory computer-readable storage medium storing computer-readable instructions that, when executed by a processor, causes an image processing device to perform: acquiring image data representing an image including a plurality of pixels, the image data including a plurality of pixel data corresponding to the plurality of pixels, each of the plurality of pixel data including a gradation value; executing an error diffusion process on each of the plurality of pixel data, the executing including: setting target pixel data from among the plurality of pixel data; acquiring a random number included in a first random number range that depends on the gradation value of the target pixel data, in a case that the gradation value of the target pixel data is in a first range; correcting the gradation value of the target pixel data into a first corrected gradation value by using the random number; correcting the first corrected gradation value of the target pixel data into a second corrected gradation value by using a distribution error, the distribution error being set by at least one error value of at least one pixel data on which the error diffusion process has been executed; determining whether the second corrected gradation value of the target pixel data is greater than a plurality of threshold values, the plurality of threshold values including a first threshold value and a second threshold value, the second threshold value being greater than the first threshold value; setting a dot value of the target pixel data to either a first dot value or a second dot value, the first dot value being set when the second corrected gradation value is greater than the first threshold value, the second dot value being set when the second corrected gradation value is greater than the second threshold value, the first dot value indicating a size of a dot, the second dot value indicating a size of a dot greater than the size of the dot indicated by the first dot value; and setting an error value of the target pixel data based on the dot value of the target pixel data; and outputting print data determined by the dot value for each of the plurality of pixel data. The first random number range corresponding to the gradation value smaller than the second threshold value includes a specific random number such that the correcting corrects the gradation value included in the first range into the first corrected gradation value greater than the second threshold value by using the specific random number in the first random number range. The first range is greater than a first gradation value and smaller than the second threshold value, the first gradation value being greater than the first threshold value and smaller than the second threshold value.

BRIEF DESCRIPTION OF THE DRAWINGS

The particular features and advantages of the invention as well as other objects will become apparent from the following description taken in connection with the accompanying drawings, in which:

FIG. 4 is a flowchart illustrating steps in the error diffusion process;

FIG. 5 is a graph showing the relationship between gradation values and random number upper limits;

FIG. 6(A) is a graph showing a relationship between gradation values and dot-forming rates according to the embodiment; and FIG. 6(B) is a graph showing a relationship between gradation values and dot-forming rates according to a comparative example.

DETAILED DESCRIPTION

A. First Embodiment

A-1: Structure of a Printer

Figure 1:
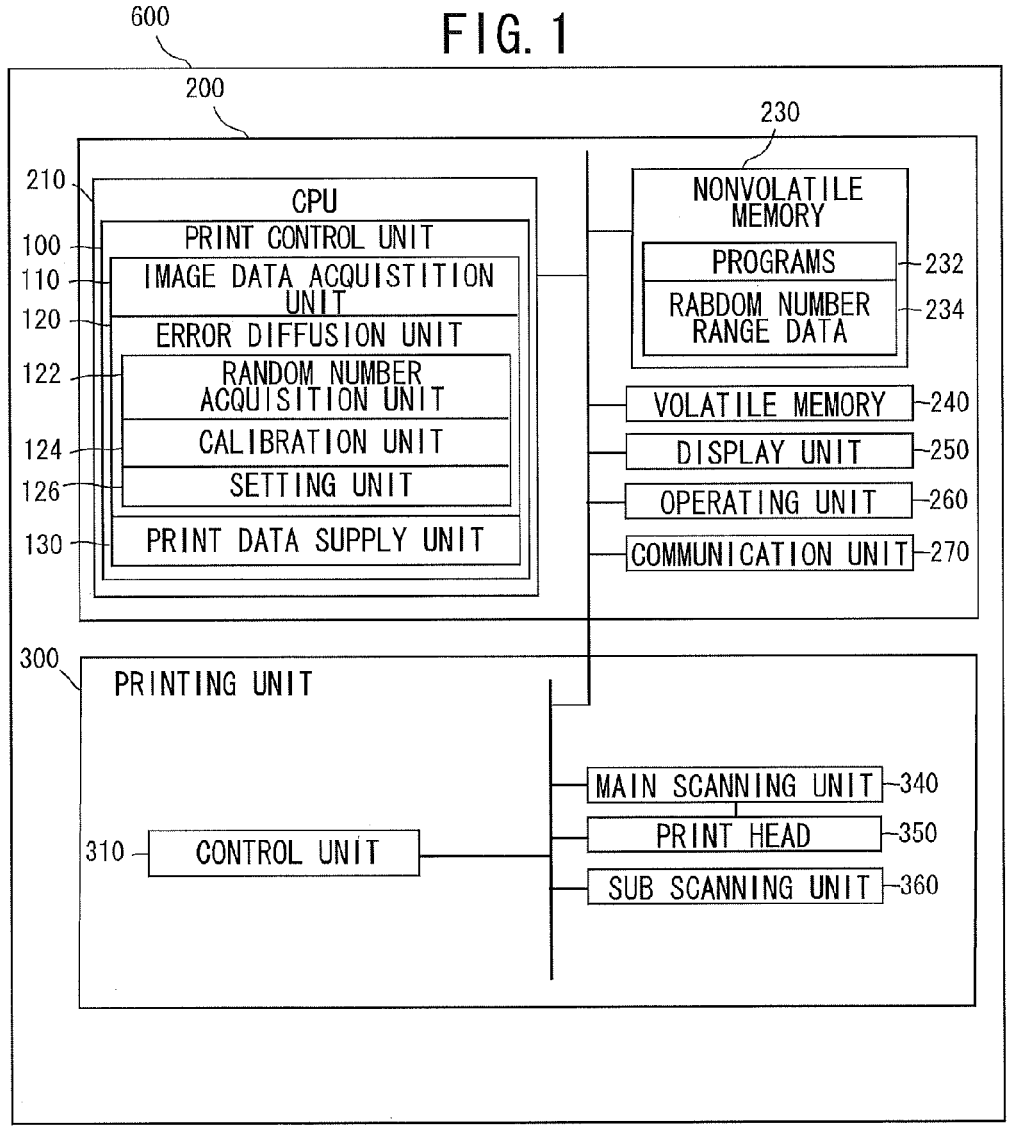
FIG. 1 is a block diagram of a printer according to an embodiment.

FIG. 1 is a block diagram of a printer 600. The printer 600 includes a control unit 200, and a printing unit 300.

The control unit 200 is a computer for controlling operations of the printer 600. The control unit 200 includes a CPU 210; a nonvolatile memory 230, such as EEPROM; a volatile memory 240, such as DRAM, providing a buffer region (an error buffer EB described later with reference to FIG. 3, for example) in which the CPU 210 stores process data; a display unit 250, such as a liquid crystal display; an operating unit 260, such as a touchscreen; and a communication unit 270 constituting an interface for communicating with external devices.

The nonvolatile memory 230 stores programs 232, and random number range data 234. The CPU 210 executes the programs 232 to implement various functions, including the functions of a print control unit 100. The print control unit 100 controls the printing unit 300 to execute printing operations using image data representing the image to be printed (hereinafter referred to as "target image data"). The target image data is supplied to the printer 600 from an external device, such as a personal computer or other computing device, a USB memory or other storage device, and the like. The random number range data 234 is data referenced during an error diffusion process described later. The random number range data 234 may also be integrated in the programs 232.

In the embodiment, the print control unit 100 includes an image data acquisition unit 110 for acquiring target image data; an error diffusion unit 120 for executing an error diffusion process as a halftone process; and a print data supply unit 130 for supplying print data including dot data generated in the error diffusion process to the printing unit 300. The error diffusion unit 120 further includes a random number acquisition unit 122 for acquiring a random calibration number RV that depends on a gradation value of the target pixel; a calibration unit 124 for calibrating the gradation value according to the gradation value of the target pixel and distributed error Et of the target pixel; a setting unit 126 for setting a dot value of the target pixel according to dot forming conditions. The processes executed by these functional units will be described later.

The printing unit 300 includes a control circuit 310, a print head 350, a main scanning unit 340, and a sub scanning unit 360.

The sub scanning unit 360 includes a conveying motor, and various conveying rollers (not shown). The sub scanning unit 360 executes a sub scan for conveying a printing medium (a sheet of paper of A3 or A4 size, for example) in a sub scanning direction under the control of the control circuit 310.

The main scanning unit 340 includes a main scanning motor, and a support shaft (not shown) that slidably supports the print head 350 so that the print head 350 can move in a main scanning direction orthogonal to the sub scanning direction. Under the control of the control circuit 310, the main scanning unit 340 executes a main scan for reciprocating the print head 350 in the main scanning direction.

While not shown in the drawings, the print head 350 has a plurality of nozzle rows corresponding to the plurality of ink colors used in printing operations. In the embodiment, the print head 350 has four nozzle rows corresponding to the four ink colors cyan (C), magenta (M), yellow (Y), and black (K). Each nozzle row has a plurality (200, for example) of nozzles for ejecting ink droplets of the same color to form dots on the printing medium. A piezoelectric element (not shown) is provided for each nozzle in order to drive the nozzle to eject ink. By varying the applied voltage for driving the piezoelectric elements, it is possible to form dots of various sizes (diameters). Each nozzle formed in the print head 350 according to the embodiment can form small dots, medium dots having a larger dot diameter than the small dots, and large dots having a larger dot diameter than the medium dots.

The control circuit 310 executes a printing operation by controlling the main scanning unit 340, the print head 350, and the sub scanning unit 360 according to print data supplied from the control unit 200.

A-2: Overview of a Printing Process

Figure 2:
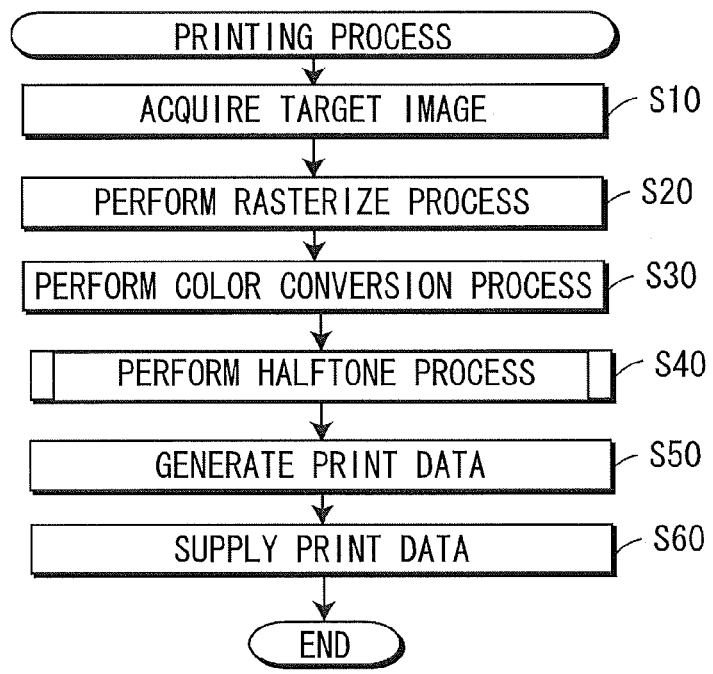
FIG. 2 is a flowchart illustrating steps in a printing process executed by the printer of FIG. 1.

FIG. 2 is a flowchart illustrating steps in a printing process executed by the printer 600 of FIG. 1. The print control unit 100 begins the printing process in response to a user command (for example, an operation executed by the user on the operating unit 260 or a print job received from a user's computer (not shown) connected to the communication unit 270).

In S10 of the printing process, the image data acquisition unit 110 acquires target image data. The image data acquisition unit 110 may extract this target image data from print jobs received from external computers, or from image data stored in the nonvolatile memory 230. The target image data is image data described in a page description language or image data compressed in the JPEG format, for example.

In S20 the image data acquisition unit 110 converts the target image data to RGB image data through a rasterization process. The pixel data constituting the RGB image data is data (RGB values) expressing pixel colors in gradation values (256 levels from 0 to 255, for example) for each of three color components red (R), green (G), and blue (B), for example.

In S30 the image data acquisition unit 110 converts the RGB image data to CMYK image data through a color conversion process. The pixel data constituting the CMYK image data is CMYK values expressing pixel colors in gradation values for the four color components corresponding to the ink colors CMYK. The color conversion process is performed using a lookup table with correlations between RGB values and CMYK values. The number of gradations for each component in the CMYK data is 1,024 levels from 0 to 1,023 in the embodiment, which is larger than the number of dot formation states (four in the embodiment: large dot, medium dot, small dot, and no dot). The number of gradations for the CMYK values is not limited to 1,024, but may be another number, such as 256 gradations from 0 to 255.

After completing the color conversion process, the image data acquisition unit 110 may also execute color correction processes, such as a calibration process and an ink quantity adjustment process. The calibration process is performed to correct the value of each of the CMYK color components so that the actual densities of colors printed on the printing medium change linearly in response to changes in the CMYK values. The ink quantity adjustment process is performed to correct each of the CMYK component values so that the quantity of ink required for printing does not exceed a reference quantity.

In S40 the error diffusion unit 120 converts the CMYK image data to dot data through a halftone process. The halftone process serves to convert each gradation value of the CMYK components constituting the CMYK image data to dot data representing the formation state of a dot for each pixel. The halftone process executed by the error diffusion unit 120 is an error diffusion process employing error matrices. The error diffusion process will be described later.

In S50 the print control unit 100 generates print data from the dot data. Print data is data in a format that the printing unit 300 can interpret. The print control unit 100 generates print data by rearranging the dot data in an order used for printing, and by adding various printer control codes, data identification codes, and the like.

In S60 the print data supply unit 130 provides the print data to the printing unit 300. The printing unit 300 prints an image based on the print data received from the print data supply unit 130.

A-3: Error Diffusion Process

A-3-1: Steps in the Process

Figure 3:
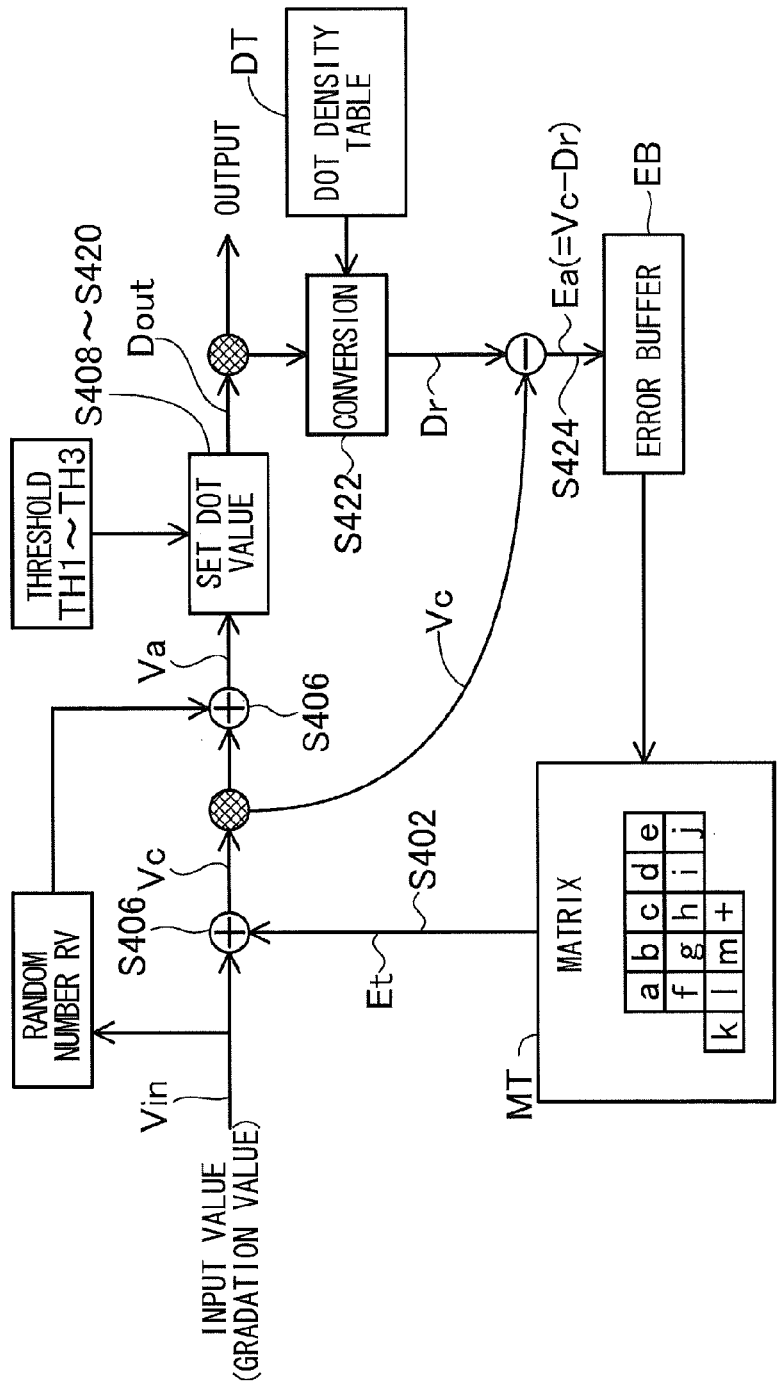
FIG. 3 is an overview of an error diffusion process.

The halftone process according to the embodiment is an error diffusion process. FIG. 3 is an overview of the error diffusion process, and FIG. 4 is a flowchart illustrating steps in the process. The error diffusion unit 120 executes this error diffusion process on each of the CMYK component values making up the CMYK image data. The error diffusion process for a single component (the cyan component, for example) is executed for each pixel. The CMYK image data represents an image having a plurality of pixels arranged in a matrix with a vertical dimension (columns) and a horizontal dimension (rows), for example. By executing the error diffusion process sequentially for each pixel in a row, the error diffusion unit 120 performs the process on a single row of pixels extending in the horizontal direction. After completing the process on one row of pixels, the error diffusion unit 120 executes the error diffusion process on the next row of pixels adjacent to the just-processed row in the vertical direction. Thus, the error diffusion unit 120 executes the error diffusion process on the plurality of pixel rows included in the CMYK image data by sequentially selecting each row of pixels in the vertical direction as the process target. Note that this order of processing pixels is merely an example, and the pixels may be processed in a different order.

In the error diffusion process, the error diffusion unit 120 assigns a dot value to each pixel being processed (hereinafter referred to as the target pixel). A dot value of "0" represents a dot-less value indicating that no dot is formed. A dot value of "1" represents a small dot value indicating that a small dot is formed. A dot value of "2" represents a medium dot value indicating that a medium dot is formed. A dot value of "3" represents a large dot value indicating that a large dot is formed.

In S402 at the beginning of the error diffusion process, the calibration unit 124 of the error diffusion unit 120 collects error values recorded in an error buffer EB and acquires a distributed error Et for the target pixel using an error matrix MT. The error buffer EB stores error values Ea for all pixels that have undergone the error diffusion process, i.e., processed pixels for which dot values have been set in the error diffusion process. The error values Ea are generated by performing the error diffusion process on the corresponding processed pixels. The error matrix MT defines distribution ratios that are assigned to each pixel in a prescribed relative position to the target pixel (a peripheral position to the target pixel). In the error matrix MT of FIG. 3, the "+" symbol represents the target pixel, and distribution ratios a-m have been assigned to peripheral pixels. The distribution ratios a-m total "1". Using the error matrix MT, the calibration unit 124 calculates the distributed error Et of the target pixel to be the sum of products obtained by multiplying the error value Ea of each peripheral pixel by the corresponding distribution ratio.

In S404 the random number acquisition unit 122 of the error diffusion unit 120 acquires a random calibration number RV based on the gradation value of the target pixel (the input value Vin). FIG. 5 is a graph showing the relationship between gradation values and random number upper limits RT. As shown in FIG. 5, random number upper limits RT are defined for the gradation values (where random number upper limits RT≥0) and are stored in the random number range data 234 (see FIG. 1). The random number upper limits RT indicate the ceiling for a range of possible random calibration numbers RV (range of random numbers). A random number lower limit RU (not shown) defines the minimum value in a range of random numbers. In the embodiment, the random number lower limits RU are found by multiplying the random number upper limits RT by −1. Assuming that the random number upper limit RT set for the gradation value Vin of the target pixel is the random number upper limit RT(Vin), then the range of random calibration numbers RV(Vin) for the gradation value Vin of the target pixel is −RT(Vin)≤RV(Vin)≤+RT(Vin). One of the integer values included in the range of random numbers is acquired at a uniform probability as the random calibration number RV(Vin). As described above, the range of random numbers is defined by the random number upper limits RT set as shown in FIG. 5. Since the median value of random calibration numbers RV is 0, the average value (expected value) of random calibration numbers RV is 0. The random number upper limits RT will be described later in greater detail.

In S406 the calibration unit 124 calculates a calibrated gradation value Va by adding the distributed error Et and the random calibration number RV to the gradation value Vin of the target pixel. In other words, the calibrated gradation value Va is expressed by the following equation.

Calibrated gradation value $Va$=gradation value $Vin$+ distributed error $Et$+random calibration number $RV$=error-added gradation value $Vc$+random calibration number $RV$ Here, the error-added gradation value Vc is the sum of the gradation value Vin and the distributed error Et (Vc=Vin+Et). Configuring the average value of the random calibration numbers RV to be 0 reduces the chance that the random calibration number RV will produce a different color in the printed image from the color of the target image data. Adding the distributed error Et to the gradation value Vin of the target pixel will also be called a first calibration using the distributed error Et, while adding the random calibration number RV to the gradation value Vin of the target pixel will also be called a second calibration using the random calibration number RV.

In S408 the setting unit 126 determines whether the calibrated gradation value Va is greater than a large dot threshold TH3. If the calibrated gradation value Va is greater than the large dot threshold TH3 (S408: YES), in S410 the setting unit 126 outputs the large dot value, i.e., sets the dot value for the target pixel to the large dot value.

However, if the calibrated gradation value Va does not exceed the large dot threshold TH3 (S408: NO), in S412 the setting unit 126 determines whether the calibrated gradation value Va is greater than a medium dot threshold TH2. If the calibrated gradation value Va is greater than the medium dot threshold TH2 (S412: YES), in S414 the setting unit 126 outputs the medium dot value, i.e., sets the dot value for the target pixel to the medium dot value.

However, if the calibrated gradation value Va does not exceed the medium dot threshold TH2 (S412: NO), then in S416 the setting unit 126 determines whether the calibrated gradation value Va is greater than a small dot threshold TH1. If the calibrated gradation value Va is greater than the small dot threshold TH1 (S416: YES), in S418 the setting unit 126 outputs the small dot value, i.e., sets the dot value for the target pixel to the small dot value.

However, if the calibrated gradation value Va does not exceed the small dot threshold TH1 (S416: NO), in S420 the setting unit 126 sets the dot value for the target pixel to a value indicating that a dot is not to be formed (no dot).

Thus, the condition described above for setting the dot value of the target pixel to the large dot value, i.e., the large dot forming condition for forming a large dot is that the calibrated gradation value Va is greater than the large dot threshold TH3. Further, the medium dot forming condition for forming a medium dot is that the calibrated gradation value Va is greater than the medium dot threshold TH2 and less than or equal to the large dot threshold TH3. The small dot forming condition for forming a small dot is that the calibrated gradation value Va is greater than the small dot threshold TH1 and less than or equal to the medium dot threshold TH2. In the embodiment, the small dot threshold TH1, the medium dot threshold TH2, and the large dot threshold TH3 are set to 0, 200, and 600, respectively.

In S422 the error diffusion unit 120 converts the dot value Dout (see FIG. 3) set in the above steps to the corresponding dot density value Dr. Four dot density values Dr are provided to correspond to the four possible dot values Dout. The dot density value Dr indicates the density represented by one of four types of dot formation states and is expressed as a gradation value corresponding to the respective CMYK value. In the embodiment, the dot density values Dr are set as follows.
A) Large dot: dot density value Dr=1,536
B) Medium dot: dot density value Dr=600
C) Small dot: dot density value Dr=200
D) No dot: dot density value Dr=0

The dot density values Dr are integrated in the programs 232 as a relative value table DT.

In S424 the error diffusion unit 120 calculates the error value Ea according to the following equation.

Error value Ea=error-added gradation value Vc–dot density value Dr=calibrated gradation value Va–random calibration number RV–dot density value Dr The error value Ea indicates error produced between the dot density value Dr corresponding to the dot value set for the target pixel, and the error-added gradation value Vc (described above) for the target pixel. The error-added gradation value Vc is a value obtained by subtracting the random calibration number RV from the calibrated gradation value Va. The error diffusion unit 120 records the error value Ea in the error buffer EB. The error buffer EB stores error values Ea calculated in S424 for each processed pixel for which a dot value has been set in the error diffusion process. The distributed error Et acquired in S402 described above is the error distributed to the target pixel using the error matrix MT from among the error values Ea recorded in the error buffer EB, i.e., the error values Ea produced for the processed pixels.

Thus, the error diffusion process described above generates dot data for each color of ink. Here, the dot data includes a dot value for each pixel.

A-3-2: Random Number Upper Limits RT

Here, the random number upper limits RT will be described in greater detail. When not accounting for the distributed error Et, the random number upper limits RT are set to satisfy a plurality of conditions A-F described next. The condition A states that the dot value for the target pixel must not be set to a medium dot value when the gradation value Vin of the target pixel falls within the range 0<Vin<Vm (hereinafter called gradation range A). In other words, the condition A requires that the sum of a gradation value Vin within the gradation range A and the random number upper limit RT(Vin) (i.e., Vin+RT(Vin)) does not exceed the medium dot threshold TH2. The condition A is satisfied when the random number upper limits RT are set within a region Bm below a first dashed line Lm shown in FIG. 5 (the shaded area within gradation range A). Hence, random number upper limits RT in the embodiment are set so that the bold line indicating the random number upper limits RT in the graph of FIG. 5 passes through the region Bm.

The condition B states that the dot value for the target pixel must have the potential to be set to the medium dot value when the gradation value Vin of the target pixel falls within the range Vm<Vin<TH2 (hereinafter referred to as gradation range B). In other words, the condition B requires that the sum of a gradation value Vin within the gradation range B and the random number upper limit RT(Vin) be greater than the medium dot threshold TH2. Condition B is satisfied when the random number upper limits RT are set within a region Am above the first dashed line Lm shown in FIG. 5 (the shaded area within the gradation range B). Hence, the random number upper limits RT in the embodiment are set so that the bold line indicating the random number upper limits RT in the graph of FIG. 5 passes through the region Am.

The condition C states that the dot value for the target pixel must not be set to the large dot value when the gradation value Vin of the target pixel falls within the range TH2<Vin<Vn (hereinafter referred to as gradation range C). In other words, the condition C requires that the sum of a gradation value Vin within the gradation range C and the random number upper limit RT(Vin) be smaller than the large dot threshold TH3. The condition C is satisfied when the random number upper limits RT are set within a region Bn below a second dashed line Ln shown in FIG. 5 (the shaded area within the gradation range C). Hence, the random number upper limits RT in the embodiment are set so that the bold line indicating the random number upper limits RT in the graph of FIG. 5 passes through the region Bn.

The condition D states that the dot value for the target pixel must have the potential to be set to the large dot value when the gradation value Vin of the target pixel falls within the range Vn<Vin<TH3 (hereinafter referred to as gradation range D). In other words, the condition D requires that the sum of a gradation value Vin within the gradation range D and the random number upper limit RT(Vin) be greater than the large dot threshold TH3. The condition D is satisfied when the random number upper limits RT are set within a region An above the second dashed line Ln shown in FIG. 5 (the shaded area within the gradation range D). Hence, the random number upper limits RT in the embodiment are set so that the bold line indicating the random number upper limits RT in the graph of FIG. 5 passes through the region An.

The condition E states that the dot value of the target pixel must have the potential to be set to the small dot value when the gradation value Vin of the target pixel falls within the range Vo<Vin<Vmax (hereinafter referred to as gradation range E). In other words, condition E requires that the difference between a gradation value Vin within the gradation range E and the random number upper limit RT(Vin) (Vin−RT(Vin)) does not exceed the medium dot threshold TH2. Here, Vmax denotes the maximum gradation value, which is 1,023 in the embodiment. The condition E is satisfied when the random number upper limits RT are set within a region Ao (the shaded area in the gradation range E) above a third dashed line Lo (including values on the third dashed line Lo) shown in FIG. 5. Hence, the random number upper limits RT in the embodiment are set so that the bold line indicating the random number upper limits RT in the graph of FIG. 5 passes through the region Ao.

The condition F states that the dot value for the target pixel be set to a value indicating "no dot" when the gradation value of the target pixel is 0. This condition suppresses the formation of dots due to the influence of the random calibration number RV when printing an image in which dots are not to be formed, i.e., an image configured of pixels having the minimum gradation value 0, ensuring the reproducibility of image regions configured of pixels with the minimum gradation value 0. The condition F is satisfied when the random number upper limit RT is set to 0 for the minimum gradation value 0.

In the embodiment, the gradation value Vm is 50, the gradation value Vn is 300, and the gradation value Vo is 680.

In order to satisfy all the six conditions A through F described above, the random number upper limits RT in the embodiment are set to values on line segments connecting a first characteristic point P1 to a second characteristic point P2, the second characteristic point P2 to a third characteristic point P3, the third characteristic point P3 to a fourth characteristic point P4, and the fourth characteristic point P4 to a fifth characteristic point P5, as shown in the graph of FIG. 5. Hence, the random number upper limits RT in the embodiment are configured to increase as the gradation value increases within the range in which random number upper limits RT are set (the entire range 0≤Vin≤Vmax in the embodiment). In other words, the random number upper limits RT are configured to increase continuously and monotonically as the gradation value increases. The random number upper limits RT are also configured to change linearly within individual gradation ranges A-E as the gradation value increases. This configuration can minimize abrupt changes in the magnitude of random numbers as the gradation value changes, thereby ensuring continuity of tone in the printed image.

The first characteristic point P1 defines the random number upper limit RT to be 0 for the minimum gradation value 0. So, when the gradation value is the first characteristic point P1, the error diffusion unit 120 may not acquires the random calibration number. The second characteristic point P2 falls on the first dashed line Lm and defines the random number upper limit RT(Vm) for the gradation value Vm. Therefore, when the random number upper limit RT(Vm) corresponding to the second characteristic point P2 is added to gradation value Vm, the resulting gradation value (Vm+RT(Vm)) is equivalent to the medium dot threshold TH2.

The third characteristic point P3 is a point on the second dashed line Ln that defines the random number upper limit RT(Vn) for the gradation value Vn. Therefore, when the random number upper limit RT(Vn) corresponding to the third characteristic point P3 is added to the gradation value Vn, the resulting gradation value (Vn+RT(Vn)) is equivalent to the large dot threshold TH3.

The fourth characteristic point P4 is a point on the third dashed line Lo that defines the random number upper limit RT(Vo) for the gradation value Vo. Therefore, when adding the random number lower limit RU defined by the random number upper limit RT(Vo) corresponding to the fourth characteristic point P4 for the gradation value Vo (i.e., −RT(Vo)), the resulting gradation value (Vo−RT(Vo)) is equivalent to the medium dot threshold TH2.

The fifth characteristic point P5 is a point on the third dashed line Lo that defines the random number upper limit RT(Vmax) for the maximum gradation value Vmax. Therefore, when adding the random number lower limit RU defined by the random number upper limit RT(Vmax) corresponding to the fifth characteristic point P5 for the maximum gradation value Vmax (i.e., −RT(Vmax)), the resulting gradation value (Vmax−RT(Vmax)) is equivalent to the medium dot threshold TH2.

More specifically, random number upper limits RT within the gradation range A are set to values falling on the line segment between characteristic points P1 and P2 in the graph of FIG. 5 so that the values change linearly in response to changes in gradation values within this range. As a result, random number upper limits RT within the gradation range A pass through the region Bm, satisfying the condition A. In addition, the random number upper limit RT is 0 for the minimum gradation value of 0 (the first characteristic point P1), satisfying the condition F.

The random number upper limits RT within the gradation ranges B and C are set to values falling on the line segment between characteristic points P2 and P3 in the graph of FIG. 5 so that the values change linearly in response to changes in gradation values within these ranges. As a result, the random number upper limits RT within the gradation range B pass through the region Am, satisfying the condition B. Further, random number upper limits RT within the gradation range C pass through the region Bn, satisfying the condition C.

The random number upper limits RT within the range Vn<V<Vo that includes the gradation range D are set to values that fall on the line segment between characteristic points P3 and P4 in the graph of FIG. 5 so that the values change linearly in response to changes in gradation values within this range. As a result, random number upper limits RT within the gradation range D pass through the region An, satisfying the condition D.

The random number upper limits RT within the gradation range E are set to values that fall on the line segment between characteristic points P4 and P5 in the graph of FIG. 5 so that the values change linearly in response to changes in gradation values within this range. As a result, random number upper limits RT in the gradation range E pass through the region Ao, satisfying the condition E.

Next, dot-forming rates for an error diffusion process according to the embodiment will be described with reference to FIG. 6. FIGS. 6(A) and 6(B) show graphs of dot-forming rates according to the embodiment and a comparative example, and specifically the dot-forming rates for gradation values V within the range 0≤V≤1,023. The dot-forming rates for each gradation value V indicate the proportions of large dot values, the medium dot values, and the small dot values occupying dot data obtained through the error diffusion process for a uniform image configured of pixels having the gradation value V. FIG. 6(A) shows the dot-forming rates in the embodiment, while FIG. 6(B) shows the dot-forming rates in a conventional comparative example. In the error diffusion process of the comparative example, gradation values Vin are not calibrated with random calibration numbers RV.

First, the dot-forming rates in the error diffusion process according to the comparative example, i.e., a process in which dot formation is not calibrated with random calibration numbers RV, will be described with reference to FIG. 6(B). As shown in FIG. 6(B), only small dots are formed for gradation values V within the range TH1≤V≤TH2 (200), while no medium or large dots are formed. A small dot-forming rate SDb increases linearly as the gradation value increases within this range, reaching 100% at a gradation value equivalent to the medium dot threshold TH2, i.e., reaching a state in which small dots are formed for all pixels.

Next, for gradation values V within the range TH2≤V≤TH3 (600), both small and medium dots are formed, while large dots are not. Within this range, the small dot-forming rate SDb decreases linearly from 100% to 0% while a medium dot-forming rate MDb increases linearly from 0% to 100% as the gradation value increases. At the gradation value equivalent to the large dot threshold TH3, the medium dot-forming rate MDb reaches 100% while the small dot-forming rate SDb reaches 0%, at which point medium dots are formed for all pixels.

For gradation values V within the range TH3≤S≤V maximum gradation value (1,023), both medium and large dots are formed, while small dots are not. Within this range, the medium dot-forming rate MDb decreases linearly from 100% to about 55% while a large dot-forming rate LDb increases linearly from 0% to about 45% as the gradation value V increases. At the maximum gradation value (1,023), the large dot-forming rate LDb has not reached 100% because the dot density value Dr for large dots is set to 1,536 as described above, i.e., a value greater than 1,023. The embodiment accounts for printing at a relatively high resolution, such as 1,200 dpi (vertically)×1,200 dpi (horizontally). Therefore, if the large dot-forming rate LDb were to reach 100%, the quantity of ink per unit area could exceed the reference (ink could run).

The comparative example described above tends to produce more regular dots in the printed image. For example, small dots are formed for all pixels when the gradation value V is equivalent to the medium dot threshold TH2, and medium dots are formed for all pixels when the gradation value V is equivalent to the large dot threshold TH3, increasing the regularity of dots in the printed image. Even at other gradation values, regularity in the printed image is not sufficiently low because of the relatively small number of dot types being formed (a maximum of two types). If there is any irregularity in the formed size or positions of dots due to cross-talk, control errors, or other factors, fluctuations in image quality (uneven density, banding, etc.) caused by such irregularities tend to be more pronounced when dot regularity in the printed image is relatively high. Cross-talk is a phenomenon in which behavior or change accompanying the ejection of ink from a single nozzle (pressure change in the ink channel, a shock wave produced when driving the piezoelectric element, etc.) influences the ejection of ink in other nozzles.

Next, dot-forming rates in the error diffusion process according to the embodiment will be described with reference to FIG. 6(A). As shown in FIG. 6(A), a small dot-forming rate SD1 increases linearly as the gradation value increases from 0 to about 230. The small dot-forming rate SD1 reaches its largest value at about gradation value 230, then decreases continuously as the gradation value increases from about 230 to the maximum gradation value Vmax. Here, the small dot-forming rate SD1 slowly decreases as the gradation value increases. The small dot-forming rate SD1 is maintained at about 10%, even at the maximum gradation value Vmax.

A medium dot-forming rate MD 1 is essentially 0 between gradation values 0 and about 180 and begins to increase from about gradation value 180, which is smaller than the medium dot threshold TH2 (200; point SP1). The medium dot-forming rate MD1 begins to increase gradually from about gradation value 180, then increases linearly between gradation values of about 260 and about 550. The medium dot-forming rate MD1 reaches its maximum value at about gradation value 600, then decreases gradually as the gradation value increases from about 600 to the maximum gradation value Vmax. The medium dot-forming rate MD1 is maintained at about 45%, even at the maximum gradation value Vmax.

A large dot-forming rate LD1 is essentially 0 between gradation values 0 and about 350, then begins to increase from about 350 (point SP2). The large dot-forming rate LD1 first increases gradually from about gradation value 350, then increases linearly from about gradation value 600 to the maximum gradation value Vmax.

As described above, the range of gradation values V for which only small dots are formed is limited to 0<V≤about 180, which is smaller than that in the comparative example. The embodiment also differs from the comparative example in the following ways. At no time in the embodiment is one type of dot formed for all pixels. Also in the embodiment, three types of dots (large, medium, and small) are formed within a relatively large range: about 350≤V≤1,023. Therefore, the embodiment produces less regularity of dots in the printed image than the comparative example. As a result, fluctuations in image quality caused by variations in the size or positions of formed dots are less pronounced in the printed images according to the embodiment than in the printed images according to the comparative example. Hence, the method of the embodiment improves the quality of the printed image.

Next, the method of forming dots in the embodiment will be described in greater detail. In the embodiment, random number upper limits RT for gradation values within the gradation range B (Vm<Vin<TH2) are set so as to satisfy the condition B described above. That is, the range of random numbers defined by random number upper limits RT for gradation values in the gradation range B includes random numbers that, when used to calibrate the gradation value Vin in the second calibration (when random upper limit RV is added to the gradation value Vin), make the calibrated gradation value Vin greater than the medium dot threshold TH2. Therefore, when the gradation value Vin of the target pixel falls within the gradation range B, a random calibration number RV having the potential for making the calibrated gradation value Vin larger than the medium dot threshold TH2 is acquired. Consequently, if the gradation value Vin is within the gradation range B, the formation of medium dots is encouraged, even though the gradation value Vin is less than the medium dot threshold TH2.

It is not absolutely necessary to effectively begin forming medium dots from the gradation value Vm (formation of medium dots is effectively allowed from about 180 in the embodiment (see FIG. 6(A))), which is the lower limit of the gradation range B (Vm<Vin<TH2). It is relatively easy to begin forming medium dots from a desired gradation value by adjusting the random number upper limit RT and or gradation value Vm. Thus, the dot-forming rates can be properly controlled for small and medium dots, improving printing quality. The range of random numbers defined by random number upper limits RT that have been set to satisfy the condition B (i.e., the range of random numbers including random numbers that make the gradation value Vin, calibrated according to the second calibration, greater than the medium dot threshold TH2) will be called the "first range of random numbers."

In the embodiment, random number upper limits RT for gradation values within the gradation range A (0<Vin<Vm) are set so as to satisfy the condition A described above. Consequently, the range of random numbers defined by random number upper limits RT for gradation values in the gradation range A does not include random numbers capable of producing a calibrated gradation value Vin greater than the medium dot threshold TH2 when the second calibration is applied to the gradation value Vin. Accordingly, when the gradation value Vin of the target pixel falls within the gradation range A, the random number acquisition unit 122 acquires a random calibration number RV that does not make the gradation value Vin greater than the medium dot threshold TH2 in the second calibration. Thus, the formation of medium dots is not encouraged when the gradation value Vin of the target pixel falls within the gradation range A, unlike when the gradation value falls within the gradation range B.

In this way, it is easy to set a range of gradation values that encourages the formation of medium dots (the gradation range B in this example) and a range that does not encourage the formation of medium dots (the gradation range A in this example). Therefore, the dot-forming rates for small and medium dots can be more suitably controlled based on the gradation value, improving the quality of the printed image. As is clear from the above description, the range of random numbers defined by random number upper limits RT configured to satisfy the condition A differs from the first range of random numbers described above. That is, the range of random numbers defined in this way does not include values that increase the gradation value Vin to a value greater than the medium dot threshold TH2 through the second calibration.

In the embodiment, the solid line representing the random number upper limits RT in FIG. 5 is configured to pass through the second characteristic point P2. In other words, the upper limit of the range of random numbers set for the gradation value Vm, i.e., the random number upper limit RT(Vm), is set so that the gradation value Vm is calibrated to be equivalent to the medium dot threshold TH2 when undergoing the second calibration with the upper limit. Therefore, a suitable range of random numbers can be set to allow the formation of medium dots based on the gradation value Vin.

In the embodiment, random number upper limits RT are set for gradation values within gradation range D (Vn<Vin<TH3) in order to satisfy the condition D described above. Therefore, the range of random numbers defined by random number upper limits RT for gradation values within the gradation range D includes random numbers that increase the gradation values Vin to values greater than the large dot threshold TH3 when the gradation value Vin undergoes the second calibration. Accordingly, when the gradation value Vin of the target pixel falls within the gradation range D, the random number acquisition unit 122 can acquire a random calibration number RV that has the potential to increase the gradation value Vin to a value greater than the large dot threshold TH3 through the second calibration. Therefore, large dot formation is encouraged for gradation values Vin that fall within the gradation range D, even when the gradation value Vin is less than the large dot threshold TH3.

It is not absolutely necessary to effectively begin forming large dots from the gradation value Vn, which is the lower limit of the gradation range D (formation of large dots is effectively permitted from about gradation value 350 in the embodiment (FIG. 6(A))). It is relatively easy to begin formation of large dots from a desired gradation value by adjusting the value of the random number upper limit RT or the gradation value Vm. Hence, dot-forming rates of small, medium, and large dots can be suitably controlled to improve the quality of the printed image. The range of random numbers defined by random number upper limits RT that have been set to satisfy the condition D, i.e., the range of random numbers including numbers capable of increasing the gradation value Vin to a value greater than the large dot threshold TH3 through the second calibration will be called the "second range of random numbers."

In the embodiment, random number upper limits RT for gradation values within the gradation range C (TH2<Vin<Vn) are set to satisfy the condition C described above. Hence, the range of random numbers defined by random number upper limits RT for gradation values within the gradation range C do not include random numbers that will make the gradation value Vin greater than the large dot threshold TH3 through the second calibration. Accordingly, when the gradation value Vin for a target pixel falls within the gradation range C, the random number acquisition unit 122 acquires a random calibration number RV that, when used in the second calibration, will not produce a calibrated gradation value Vin greater than the large dot threshold TH3. Therefore, when the gradation value Vin of the target pixel falls in the gradation range C, the formation of large dots is not encouraged, as it is when the gradation value falls in the gradation range D.

In this way, it is easy to set a range for encouraging the formation of large dots (the gradation range D in this example) and a range for not encouraging the formation of large dots (the gradation range C in this example). Thus, dot-forming rates for small, medium, and large dots can be more properly controlled depending on the gradation values, thereby improving the quality of printed images. As is clear from the above description, the range of random numbers defined by random number upper limits RT that have been set to satisfy the condition C is different from the second range of random numbers described above since the range of random numbers defined in this way does not include random numbers capable of making the gradation value Vin greater than the large dot threshold TH3 in the second calibration.

In the embodiment, the random number upper limits RT are configured so that the solid line representing random number upper limits RT in FIG. 5 passes through the third characteristic point P3. Hence, the random number upper limit RT (i.e., the upper limit for the range of random numbers) set for the gradation value Vn is a value that, when used to execute the second calibration of the gradation value Vn, makes the calibrated gradation value Vn equivalent to the large dot threshold TH3. Hence, a suitable range of random numbers can be set to allow for the formation of large dots beginning from the gradation value Vn.

In the embodiment, random number upper limits RT for gradation values in the gradation range E (V0<Vin<Vmax) are set so as to satisfy the condition E described above. Therefore, the range of random numbers defined by random number upper limits RT for gradation values in the gradation range E include random numbers that, when applied to the gradation value Vin in the second calibration, produce a calibrated gradation value Vin smaller than or equal to the medium dot threshold TH2. Hence, when the gradation value Vin for the target pixel falls within the gradation range E, the random number acquisition unit 122 acquires a random calibration number RV that has the potential to produce a calibrated gradation value Vin no greater than the medium dot threshold TH2.

Thus, small dot formation is encouraged when the gradation value Vin falls within the gradation range E, even when the gradation value Vin is greater than the large dot threshold TH3. Consequently, the small dot-forming rate is increased in the gradation range E, improving the quality of the printed images. The range of random numbers defined by random number upper limits RT that have been set so as to satisfy the condition E, i.e., the range of random numbers including random numbers capable of producing values smaller than or equal to the medium dot threshold TH2 when applied to the gradation value Vin in the second calibration will be called a "third range of random numbers."

In the embodiment, the random number upper limits RT are set so that the solid line representing random number upper limits RT in FIG. 5 passes through the fourth characteristic point P4. Hence, the random number lower limit RU set for the gradation value Vo (i.e., a value obtained by adding a minus sign to the random number upper limit RT set for the gradation value Vo (−RT(Vo))) is a value that, when applied to the gradation value Vo in the second calibration, produces a calibrated gradation value Vo that is equivalent to the medium dot threshold TH2. Therefore, a suitable range of random numbers can be set for encouraging the formation of small dots beginning from the gradation value Vo.

In the embodiment, the random number upper limit RT for the minimum gradation value 0 is set to 0. This is equivalent to the random number acquisition unit 122 not acquiring a random calibration number RV when the gradation value of the target pixel is the minimum gradation value 0. This technique ensures the reproducibility of the minimum gradation value in a printed image, improving the quality of printed images.

In the embodiment, the dot-forming rates for three types of dots are controlled by acquiring a single random calibration number RV for each target pixel and using the random calibration number RV to calibrate the gradation value Vin of the target pixel. Accordingly, the process load in the error diffusion process can be held comparatively low. Another possible technique for controlling dot-forming rates of three types of dots is to divide the gradation value for each pixel in the target image data into three values and to assign each value to one of the three dot types. With this technique it is possible to perform the error diffusion process independently for the three types of dots using the three gradation values for each pixel. However, the method of the embodiment has less process load compared to this complex technique, thereby reducing computation time and required resources (CPU capacity, memory capacity, etc.).

B. Variations of the Embodiment

While the invention has been described in detail with reference to the embodiment thereof, it would be apparent to those skilled in the art that various changes and modifications may be made therein without departing from the scope of the invention.

(1) In the embodiment, the second calibration involves adding the random calibration number RV to the gradation value Vin. However, the second calibration may be another operation employing the random calibration number RV, such as an operation to subtract the random calibration number RV from the gradation value Vin. For example, the phrase "whether the range of random numbers includes numbers that make the gradation value Vin greater than the medium dot threshold TH2 through the second calibration" may signify "whether the sum of the gradation value Vin and the upper limit of the range of random numbers is greater than the medium dot threshold TH2 when the second calibration is the addition operation described in the embodiment" and may signify "whether the difference between the gradation value Vin and the lower limit of the range of random numbers is greater than the medium dot threshold TH2 when the second calibration is a subtraction operation."

(2) While three types of dots are used in the embodiment described above, dots of two different sizes (e.g., small dots and large dots) may be used instead. For example, if a threshold THa is used to determine whether a large dot is formed and random numbers are added to gradation values Vin within a range of gradation values smaller than the threshold THa, it is preferable to set the range of random numbers for this range of gradation values to include numbers that, when added to gradation values Vin within this range, produce values greater than the threshold THa. In this way, it is possible to encourage the formation of large dots within this range of gradation values.

(3) The first range of random numbers for the gradation range B in the embodiment described above is set so as to include random numbers capable of making the gradation value Vin greater than the medium dot threshold TH2 when the gradation value Vin is calibrated through the second calibration. However, the first range of random numbers may instead be configured to include random numbers that make the gradation value Vin greater than the large dot threshold TH3 through the second calibration. This configuration can encourage the formation of large dots in the gradation range B in addition to the formation of medium dots.

(4) While the gradation values Vm, Vn, and Vo are respectively set to 50, 300, and 680 in the embodiment, the present invention is not limited to these values. For example, the gradation value Vm may be set to an arbitrary value greater than the small dot threshold TH1 and less than the medium dot threshold TH2; the gradation value Vn may be set to an arbitrary value greater than the medium dot threshold TH2 and less than the large dot threshold TH3, and the gradation value Vo may be set to an arbitrary value greater than the large dot threshold TH3 and less than the maximum gradation value Vmax.

(5) In some cases, it may be preferable to form large dots for all pixels in uniform images having the maximum gradation value Vmax, such as when the dot density value Dr for large dots is equivalent to the maximum gradation value Vmax. In such cases, the random number upper limit RT is preferably set to 0 for the maximum gradation value Vmax to prevent the random calibration number RV from degrading reproducibility of images having the maximum gradation value Vmax.

(6) As described above in the embodiment, the second characteristic point P2 is set so that, when executing the second calibration on the corresponding gradation value Vm using the corresponding random number upper limit RT(Vm), the calibrated gradation value (Vm+RT(Vm)) is equivalent to the medium dot threshold TH2. In this way, it is possible to set the characteristic points P2, P3, P4, and P5 in the embodiment so that the result of a prescribed operation using the corresponding random number upper limit or random number lower limit and the corresponding gradation value is equivalent to a specific threshold. These characteristic points define the random number upper limit RT for each gradation value. Here, it is not necessary to set these characteristic points so that the results of the prescribed operations are exactly equal to the specific thresholds, as long as the results are nearly equivalent to the specific thresholds. That is, these characteristic points should be set so that the difference between the result of the prescribed operation and the specific threshold is smaller than or equal to a prescribed value. More specifically, the characteristic points are preferably set so that the above difference is within 5% the total number of gradations (1,024 gradations in the embodiment), and more preferably within 3%.

(7) In the embodiment, the random number upper limits RT are set so as to satisfy the conditions A-E corresponding to gradation ranges A through E, but instead may be set to satisfy only those conditions among conditions A-E that correspond to some of the gradation ranges A-E. For example, the random number upper limits RT may be set so that only the condition B (stating that the sum of the gradation value Vin and the random number upper limit RT(Vin) be greater than the medium dot threshold TH2) is satisfied for the gradation range B (Vn<Vin<TH2) and so that the conditions corresponding to all other gradation ranges are not satisfied. This configuration can at least encourage the formation of medium dots within the gradation range B.

(8) When the gradation value Vin falls within the gradation range A in the embodiment, the calibration unit 124 executes the second calibration on the gradation value Vin using a random calibration number RV acquired from a range of random numbers different from the first range of random numbers. Alternatively, the process of acquiring a random calibration number RV and executing the second calibration may be omitted when the gradation value Vin falls within the gradation range A. In general, it is preferable that the calibration process performed on a gradation value Vin not include the second calibration employing a random calibration number RV acquired from the first range of random numbers.

(9) As shown in the graph of FIG. 5, the random number upper limits RT in the embodiment are configured to increase linearly, continuously, and monotonically in response to an increase in the gradation value. However, the random number upper limits RT may include sections in which changes in random number upper limits RT relative to increasing gradation values describe a curve. Alternatively, the random number upper limits RT may include sections around specific gradation values where changes are discontinuous, such as sections in which the random number upper limit RT changes in steps as the gradation value increases. The random number upper limits RT may also include sections in which the value remains constant as the gradation value changes. However, it is preferable that the random number upper limits RT pass through the region Bm in the gradation range A and pass through the region Am in the gradation range B (see FIG. 5), regardless of how the random number upper limits RT change in response to an increase in the gradation value. Similarly, the random number upper limits RT preferably pass through regions Bn, An, and Ao in the corresponding gradation ranges C, D, and E.

(10) While the functions of the print control unit 100 are implemented by the control unit 200 in the printer 600 according to the embodiment described above, these functions may be implemented by a computing device, such as a personal computer, connected to the printer 600. In this case, the functions of the print control unit 100 may be implemented as the functions of a printer driver running on the personal computer, for example. Alternatively, the functions of the print control unit 100 may be divided among a plurality of computers that can communicate over a network (cloud servers, for example). In this case, the computers that share these functions together correspond to the print controller of the present invention.

(11) Part of the processes implemented in hardware in the embodiment may be replaced with software processes, while conversely part of the processes implemented in software may be replaced with a hardware configuration.

When all or part of the functions of the present invention are implemented in software (i.e., computer programs), this software can be supplied on a computer-readable storage medium. The "computer-readable storage medium" may be a portable medium, such as a memory card or CD-ROM; an internal storage device built into the computer, such as any of various RAM, ROM, or the like; or an external storage device, such as a hard disk drive connected to the computer.

What is claimed is:

1. A print control device comprising:
   a processor; and
   a memory that stores a computer program that, when executed by the processor, causes the control device to function as:
   an acquiring unit configured to acquire image data representing an image including a plurality of pixels, the image data including a plurality of pixel data corresponding to the plurality of pixels, each of the plurality of pixel data including a gradation value;
   an executing unit configured to execute an error diffusion process on each of the plurality of pixel data, the executing unit including:
      a target pixel setting unit configured to set target pixel data from among the plurality of pixel data;
      a random number acquiring unit configured to acquire a random number included in a first random number range that depends on the gradation value of the target pixel data, in a case that the gradation value of the target pixel data is in a first range;
      a first correcting unit configured to correct the gradation value of the target pixel data into a first corrected gradation value by using the random number;
      a second correcting unit configured to correct the first corrected gradation value of the target pixel data into a second corrected gradation value by using a distribution error, the distribution error being set by at least one error value of at least one pixel data on which the error diffusion process has been executed;
      a determining unit configured to determine whether the second corrected gradation value of the target pixel data is greater than a plurality of threshold values, the plurality of threshold values including a first threshold value and a second threshold value, the second threshold value being greater than the first threshold value;
      a dot value setting unit configured to set a dot value of the target pixel data to either a first dot value or a second dot value, the first dot value being set when the second corrected gradation value is greater than the first threshold value, the second dot value being set when the second corrected gradation value is greater than the second threshold value, the first dot value indicating a size of a dot, the second dot value indicating a size of a dot greater than the size of the dot indicated by the first dot value; and
      an error value setting unit configured to set an error value of the target pixel data based on the dot value of the target pixel data; and
   an output unit configured to output print data determined by the dot value for each of the plurality of pixel data,
   wherein the first random number range corresponding to the gradation value smaller than the second threshold value includes a specific random number such that the first correcting unit corrects the gradation value included in the first range into the first corrected gradation value greater than the second threshold value by using the specific random number in the first random number range, the first range being greater than a first gradation value and smaller than the second threshold value, the first gradation value being greater than the first threshold value and smaller than the second threshold value.

2. The print control device according to claim 1, wherein when the gradation value of the target pixel data is in a second range, the random number acquiring unit does not acquire the random number included in the first random number range, but acquires a random number included in a random number range different from the first random number range, and the first correcting unit corrects, into the first corrected gradation value, the gradation value of the target pixel data by using the random number included in the random number range different from the first random number range,
   wherein the second range is greater than or equal to the first threshold value and smaller than the first gradation value.

3. The print control device according to claim 1, wherein the first random number range includes an upper limit value and a lower limit value,
   wherein when the gradation value is equal to the first gradation value, the first correcting unit corrects the gradation value into the first corrected gradation value substantially equal to the second threshold value by using one of the upper limit value of the first random number range and the lower limit value of the first random number range.

4. The print control device according to claim 1, wherein the random number acquiring unit acquires the random number included in a second random number range that depends on the gradation value of the target pixel data when the gradation value of the target pixel data is in a third range,
   wherein the determining unit further determines whether the second corrected gradation value of the target pixel data is greater than a third threshold value greater than the second threshold value,
   wherein the dot value setting unit sets the dot value of the target pixel data to a third dot value when the second corrected gradation value is greater than the third threshold value, the third dot value indicating a size of a dot greater than the size of the dot indicated by the second dot value, wherein the second random number range corresponding to the gradation value in the third range includes a specific random number such that the first correcting unit corrects the gradation value into the first corrected gradation value greater than the third threshold value by using the specific random number in the second random number range, wherein the third range is greater than or equal to the second threshold value and smaller than the third threshold value.

5. The print control device according to claim 4, wherein the third range is greater than or equal to a second gradation value, the second gradation value being greater than the second threshold value and smaller than the third threshold value, wherein the second random number range includes an upper limit value and a lower limit value, wherein when the gradation value is equal to the second value, the first correcting unit corrects the gradation value into the first corrected gradation value substantially equal to the third threshold value by using one of the upper limit value of the second random number range and the lower limit value of the second random number range.

6. The print control device according to claim 4, wherein the random number acquiring unit acquires the random number included in a third random number range that depends on the gradation value of the target pixel data when the gradation value of the target pixel data is in a fourth range, the fourth range being greater than the third threshold value, wherein the determining unit further determines whether the second corrected gradation value of the target pixel data is greater than the third threshold value, wherein the third random number range corresponding to the gradation value in the fourth range includes a specific random number such that the first correcting unit corrects the gradation value into the first corrected gradation value smaller than the second threshold value by using the specific random number in the third random number range.

7. The print control device according to claim 6, wherein the third range is greater than or equal to a third gradation value, the gradation third value being greater than the third threshold value, wherein the third random number range includes an upper limit value and a lower limit value, wherein when the gradation value is equal to the third gradation value, the first correcting unit corrects the gradation value into the first corrected gradation value substantially equal to the second threshold value by using one of the upper limit value of the third random number range and the lower limit value of the third random number range.

8. The print control device according to claim 1, wherein the first random number range includes an upper limit value and a lower limit value, wherein one of the upper limit value of the first random number range and the lower limit value of the first random number range increases when the gradation value in the first range increases.

9. A print control device comprising:
a processor; and
a memory that stores a computer program that, when executed by the processor, causes the control device to function as:

an acquiring unit configured to acquire image data representing an image including a plurality of pixels, the image data including a plurality of pixel data corresponding to the plurality of pixels, each of the plurality of pixel data including a gradation value;

an executing unit configured to execute an error diffusion process on each of the plurality of pixel data, the executing unit including:

a target pixel setting unit configured to set target pixel data from among the plurality of pixel data;

a random number acquiring unit configured to acquire a random number included in a random number range that depends on the gradation value of the target pixel data, in the case that the gradation value of the target pixel data is in a gradation range, the gradation range being greater than or equal to a first gradation value and smaller than or equal to a second gradation value;

a first correcting unit configured to correct the gradation value of the target pixel data into a first corrected gradation value by using the random number;

a second correcting unit configured to correct the first corrected gradation value of the target pixel data into a second corrected gradation value by using a distribution error, the distribution error being set by at least one error value of at least one pixel data on which the error diffusion process has been executed;

a determining unit configured to determine whether the second corrected gradation value of the target pixel data is greater than a plurality of threshold values, the plurality of threshold values including a first threshold value, a second threshold value, and a third threshold value, the second threshold value being greater than the first threshold value, the third threshold value being greater than the second threshold value;

a dot value setting unit configured to set a dot value of the target pixel data to one of a first dot value, a second dot value, and a third dot value, the first dot value being set when the second corrected gradation value is greater than the first threshold value, the second dot value being set when the second corrected gradation value is greater than the second threshold value, the third dot value being set when the second corrected gradation value is greater than the third threshold value, the first dot value indicating a size of a dot, the second dot value indicating a size of a dot greater than the size of the dot indicated by the first dot value, the third dot value indicating a size of a dot greater than the size of the dot indicated by the second dot value; and an error value setting unit configured to set an error value of the target pixel data based on the dot value of the target pixel data; and an output unit configured to output print data determined by the dot value for each of the plurality of pixel data, wherein the first gradation value is greater than the first threshold value and smaller than the second threshold value, wherein the second gradation value is greater than the second threshold value and smaller than the third threshold value, wherein the random range includes an upper limit value and a lower limit value, wherein one of the upper limit value and the lower limit value changes linearly according to change of the gradation value in the gradation range, wherein the first correcting unit corrects the first gradation value into the first corrected gradation value substantially equal to the second threshold value by using, as the random number, a first specific value, wherein the first specific value is the one of the upper limit value and a lower limit value when the gradation value is the first gradation value, wherein the first correcting unit corrects the second gradation value into the first corrected gradation value substantially equal to the second threshold value by using, as the random number, a second specific value, wherein the second specific value is a maximum random number in the random number range when the gradation value is the second gradation value.

10. The print control device according to claim 9, wherein the gradation value is capable of being set greater than or equal to a minimum gradation value, wherein the random number acquiring unit does not acquire the random number in a case that the gradation value of the target pixel data.

11. A non-transitory computer-readable storage medium storing computer-readable instructions that, when executed by a processor, causes an image processing device to perform:

acquiring image data representing an image including a plurality of pixels, the image data including a plurality of pixel data corresponding to the plurality of pixels, each of the plurality of pixel data including a gradation value;

executing an error diffusion process on each of the plurality of pixel data, the executing including:

setting target pixel data from among the plurality of pixel data;

acquiring a random number included in a first random number range that depends on the gradation value of the target pixel data, in a case that the gradation value of the target pixel data is in a first range;

correcting the gradation value of the target pixel data into a first corrected gradation value by using the random number;

correcting the first corrected gradation value of the target pixel data into a second corrected gradation value by using a distribution error, the distribution error being set by at least one error value of at least one pixel data on which the error diffusion process has been executed;

determining whether the second corrected gradation value of the target pixel data is greater than a plurality of threshold values, the plurality of threshold values including a first threshold value and a second threshold value, the second threshold value being greater than the first threshold value;

setting a dot value of the target pixel data to either a first dot value or a second dot value, the first dot value being set when the second corrected gradation value is greater than the first threshold value, the second dot value being set when the second corrected gradation value is greater than the second threshold value, the first dot value indicating a size of a dot, the second dot value indicating a size of a dot greater than the size of the dot indicated by the first dot value; and setting an error value of the target pixel data based on the dot value of the target pixel data; and outputting print data determined by the dot value for each of the plurality of pixel data, wherein the first random number range corresponding to the gradation value smaller than the second threshold value includes a specific random number such that the correcting corrects the gradation value included in the first range into the first corrected gradation value greater than the second threshold value by using the specific random number in the first random number range, the first range being greater than a first gradation value and smaller than the second threshold value, the first gradation value being greater than the first threshold value and smaller than the second threshold value.

* * * * *